United States Patent [19]

Komatu et al.

[11] 4,376,931

[45] Mar. 15, 1983

[54] SYSTEM FOR DETECTING ABNORMALITY IN INTERNAL PRESSURE OF TIRE

[75] Inventors: Satoru Komatu; Sumio Kobane; Masanobu Yamamoto, all of Tokyo; Hiroshi Takahashi, Kodaira; Terutsugu Izumo, Funabashi, all of Japan

[73] Assignee: Meisei Electric Co., Ltd., Tokyo, Japan

[21] Appl. No.: 188,590

[22] Filed: Sep. 18, 1980

[30] Foreign Application Priority Data

Feb. 7, 1980 [JP] Japan ................................. 55-12988

[51] Int. Cl.³ ............................................. B60C 23/02
[52] U.S. Cl. .................................. 340/58; 200/61.22; 200/61.25; 340/539
[58] Field of Search ............... 340/58, 539; 200/61.22, 200/61.25

[56] References Cited

U.S. PATENT DOCUMENTS 3,723,966 3/1973 Mueller et al. ........................ 340/58

FOREIGN PATENT DOCUMENTS 723815 2/1955 United Kingdom .
1114518 5/1968 United Kingdom .
1206925 9/1970 United Kingdom .

*Primary Examiner*—John W. Caldwell, Sr.
*Assistant Examiner*—Joseph E. Nowicki
*Attorney, Agent, or Firm*—Toren, McGeady and Stanger

[57] ABSTRACT

A detection system for detecting abnormality in the internal air pressure of a tire of a motor vehicle produces an alarm upon detection of an abnormal change in the air pressure of the tire. The system comprises a first device which is disposed at a wheel (or a rotating part) of the motor vehicle and has an abnormal pressure detecting means using a crystal resonator and an antenna for sending out detection information in the air; and a second device which is disposed for example in the vicinity of a driver's seat (or at a non-rotating part) and has a transmitter/receiver arrangement provided with an antenna. The crystal resonator is driven by an exciting energy sent out from the transmission part of the transmitter/receiver. Immediately after ceasing of the exciting energy from being sent out, a signal is discharged from the crystal resonator by an oscillatory energy accumulated at the above stated resonator and is received by the receiving part of the transmitter/receiver to show abnormality in the internal pressure of the tire if there is any. The crystal resonator is either used solely as information (abnormal decrease of air pressure in the tire) transmitting means in combination with an abnormality detecting switch (a pressure responsive element) or used also for abnormal pressure detection as well as for transmission of the information.

7 Claims, 12 Drawing Figures

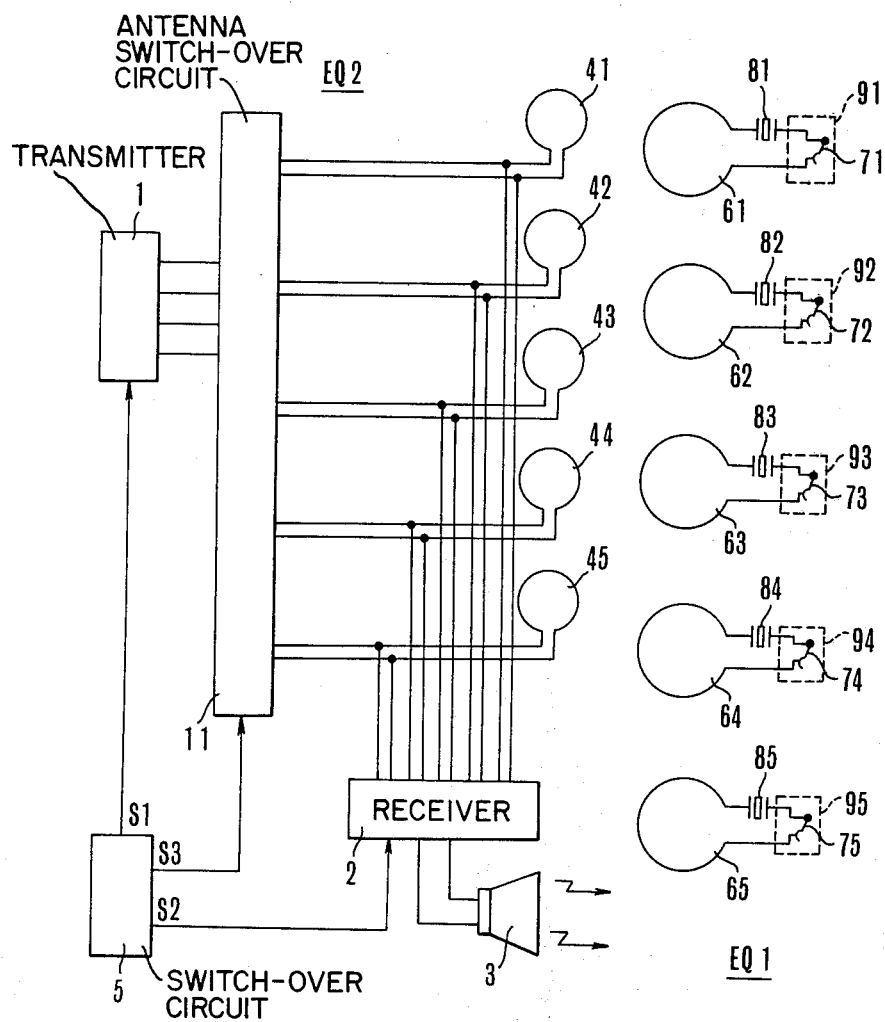

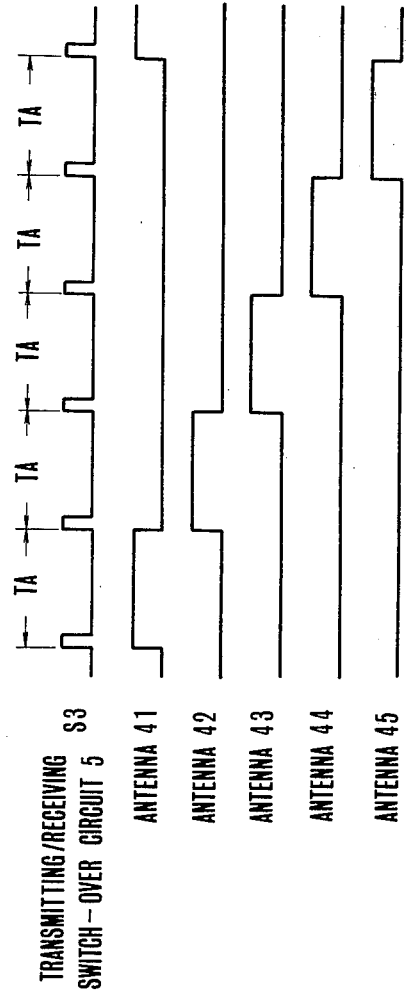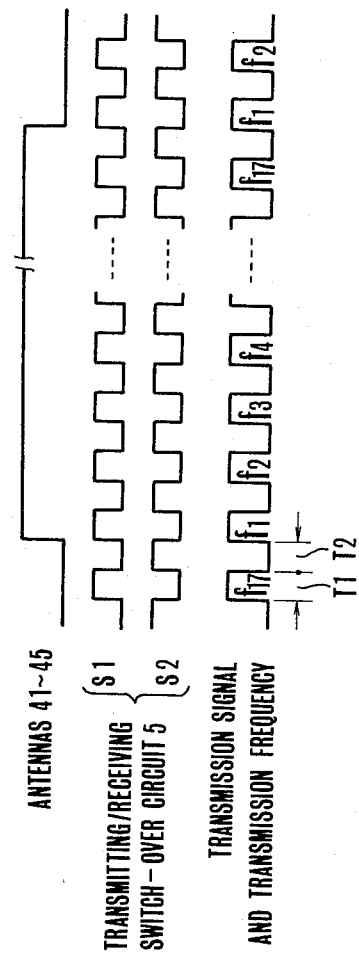

SYSTEM FOR DETECTING ABNORMALITY IN INTERNAL PRESSURE OF TIRE

BACKGROUND OF THE INVENTION

This invention relates to a system for detecting abnormality in the internal pressure of a tire which is arranged to automatically detect an abnormal drop taking place for some reason in the internal air pressure of a tire of a motor vehicle and to have an alarm issued in response to a detection signal to inform the driver or the like of the motor vehicle of the abnormality in the air pressure of the tire.

To prevent accidents, it is important to detect an abnormal drop in the air pressure of tires of a motor vehicle while it is on the run or in repose, or immediately before a start at the latest, and to inform the driver of the abnormal pressure droppage.

However, since a wheel of a motor vehicle or the like is a rotating body, power supply to an abnormal pressure detector which is normally to be disposed within a tire of the wheel is difficult. Although power supply can be effected by means of a battery or the like, it is not easy to replace the battery. Besides, it is also difficult to obtain information from such an abnormal pressure detecting means through wiring connection. In addition to that, there is another problem that noises produced by the engine of the motor vehicle and broadcasting radio waves coming from outside to be strongly received tend to make perception of an abnormality detection signal difficult.

SUMMARY OF THE INVENTION

It is therefore a general object of the invention to provide a novel system for detecting abnormal internal pressure of a tire which has an abnormal pressure detecting means arranged to operate without any power supply and is capable of receiving abnormal pressure detecting information from the abnormal pressure detecting means without any wired connection thereto and yet without any fear of disturbance by external noises.

To have the abnormal pressure detecting means operate without power supply and to obtain the abnormal pressure detection information from this detecting means without having recourse to wired connection therewith, the invention utilizes the following property of a crystal resonator: When a crystal resonator is excited from outside by a signal of a frequency equal to the natural frequency thereof, the crystal resonator begins to oscillate and comes to accumulate an oscillatory energy therein. After ceasing of the excitation from outside, the accumulated oscillatory energy is discharged to the outside in a form of a signal which makes damping oscillation at the natural frequency of the crystal resonator.

In accordance with the present invention, the system comprises a first device which is disposed at a wheel (or a rotating part) of a motor vehicle and has an abnormal pressure detecting means using a crystal resonator and an antenna for sending out detected information in the air; and a second device which is disposed for example in the vicinity of a driver's seat (or at a non-rotating part) and has a transmitter/receiver arrangement which is provided with an antenna. The crystal resonator is driven by an exciting energy sent out from the transmission part of the transmitter/receiver. Then, immediately after ceasing of the exciting energy from being sent out, a signal is discharged from the crystal resonator by an oscillatory energy accumulated at the above stated resonator and is received by the receiver section of the transmitter/receiver arrangement to show abnormality in the internatl pressure of the tire, if there is any.

The crystal resonator can be used by either of two different methods: In one method, the crystal resonator is used in combination with an abnormal pressure detection switch (or a pressure responsive element) and is arranged to be used solely as means for transmitting information on an abnormal drop of the internal air pressure of the tire. In the other method, the property of the crystal resonator that the natural frequency thereof changes when a stress is applied thereto is utilized and the crystal resonator is used also as means for detecting abnormal pressure as well as its use as information transmitting means.

Further, in accordance with the invention, disturbance by external noises is prevented by disposing the above stated antenna in a position where the rim of the wheel serves to give a shielding effect.

The above and further objects, features and advantages of the invention will become apparent from the following detailed description of embodiments thereof taken in connection with the accompanying drawings.

BRIEF DESCRIPTION OF THE DRAWINGS

Each of the accompanying drawings shows a preferred embodiment of the invention.

FIG. 6 is a block diagram of a further embodiment showing a part of it in the form of a circuit diagram with the embodiment arranged to detect abnormal internal pressure of a plurality of wheels individually.

FIGS. 7(A) and 7(B) are time charts showing the operation of the embodiment shown in FIG. 6.

DETAILED DESCRIPTION OF PREFERRED EMBODIMENTS

Figure 1:
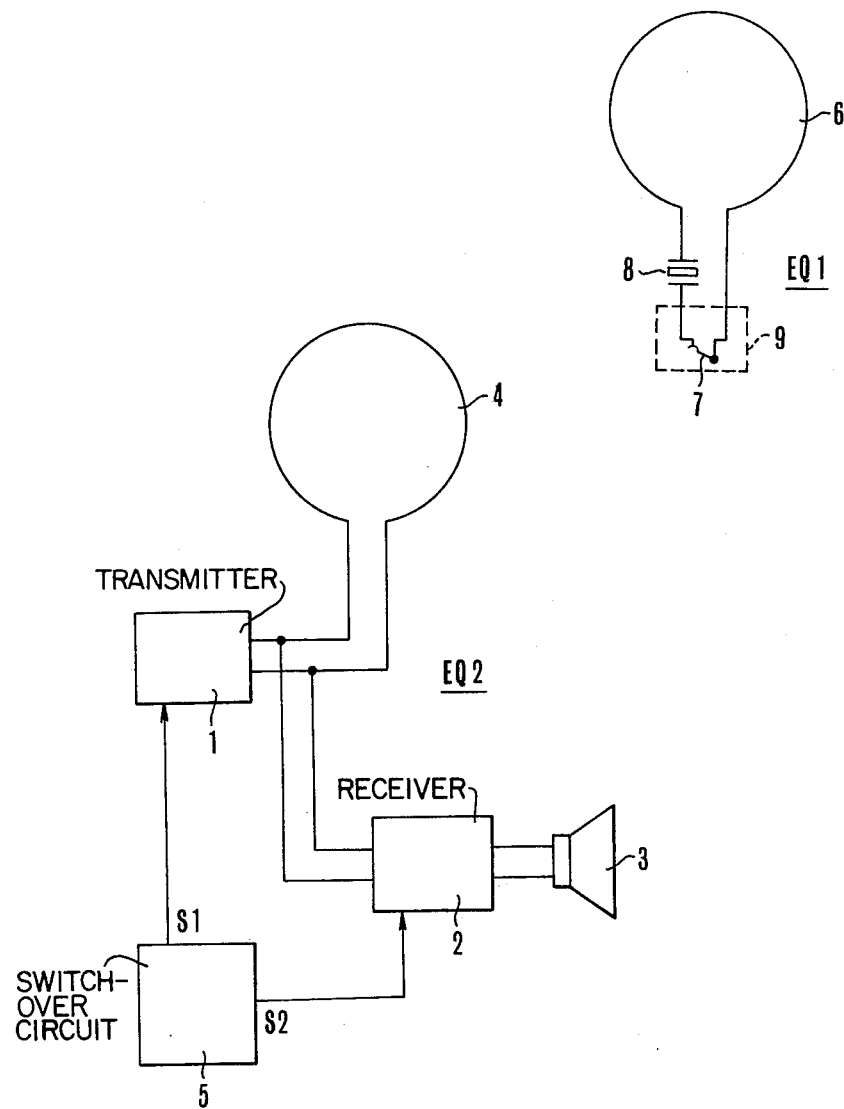
FIG. 1 is a block diagram of an embodiment showing a part of it in the form of a circuit diagram.
Figure 2:
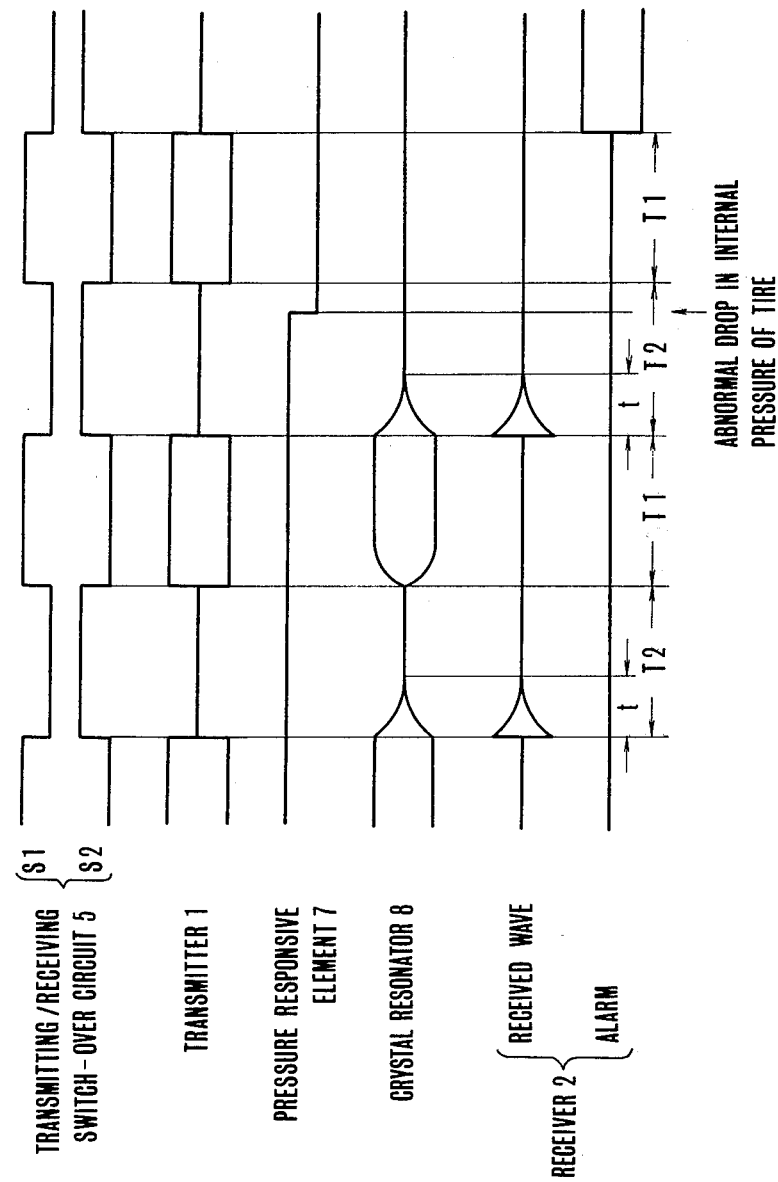
FIG. 2 is a wave-form chart showing the operation of the embodiment shown in FIG. 1.

In the first embodiment of the invention which is represented by the block diagram of FIG. 1 and by the wave-form chart of FIG. 2, a crystal resonator is used in combination with a pressure responsive element. Referring to FIG. 1, there are provided a first device EQ1; a second device EQ2; a transmitter 1; a receiver 2; a speaker 3 (or an alarm); an antenna 4; a transmitting-/receiving switch-over circuit 5; another antenna 6; the pressure responsive element 7; the crystal resonator 8; and the interior 9 of a tire. In FIG. 2 which shows the operation of the first embodiment, the wave-form of a signal from the transmitter 1, the wave-form of the crystal resonator 8, that of a received wave at the receiver 2 and that of the sound of the alarm are shown.

The transmitter 1 is arranged to be actuated by an instruction signal from the transmitting/receiving switch-over circuit 5 and to send out a signal of a frequency value equal to the natural frequency of the crystal resonator 8. The receiver 2 is arranged to be actuated by an instruction signal from the transmitting/receiving switch-over circuit 5 to receive a signal from the crystal resonator 8 and performs a function of perceiving an abnormality in the internal pressure of the tire 9 on the basis of whether or not the signal is received. The speaker functions as an alarm and is arranged to produce a warning sound when the receiver perceives an abnormality in the internal pressure of the tire 9. The antenna 4 is arranged into a loop-like shape to receive the signal sent out from the transmitter 1 and to transmit the signal to another antenna 6 by electromagnetic induction. The antenna 4 is also arranged to receive a signal produced from the crystal resonator 8 through the antenna 6 by electromagnetic induction.

The transmitting/receiving switch-over circuit 5 is arranged to issue operation instruction signals alternately to the transmitter 1 and the receiver 2 and thus alternately actuates the transmitter 1 and the receiver 2. The antenna 6 is arranged to receive the signal produced by the transmitter 1 and sent out through the antenna 4 by electromagnetic induction and is formed into a loop-like shape. The antenna 6 is also arranged to transmit the signal from the crystal resonator 8 to the antenna 4 by electromagnetic induction.

The pressure responsive element 7 is composed of a switch and is arranged to detect abnormality in the internal pressure of the tire 9, the switch being arranged to open when the pressure becomes lower than a predetermined reference value. The crystal resonator 8 has a given natural frequency and is arranged to be excited by a signal (or an exciting energy) from the transmitter 1 and to produce a signal for transmitting information as to whether the circuit of the pressure responsive element 7 is open or not to the receiver 2.

The first device EQ1 comprises the above stated antenna 6, the pressure responsive element 7 and the crystal resonator 8 and is disposed at a wheel which is a rotating part of a motor vehicle. The second device EQ2 comprises the above stated transmitter 1, the receiver 2, the speaker 3, the antenna 4 and the transmitting/receiving switch-over circuit 5 and is disposed at a non-rotating part of the motor vehicle such as a part in the vicinity of the driver's seat of the vehicle, with the exception that: The antenna 4 of the second device EQ2 is disposed at another non-rotating part in the vicinity of the wheel and is arranged to confront the antenna 6 of the first device EQ1.

As shown in FIG. 2, the transmitting/receiving switch-over circuit 5 of the second device EQ2 alternately issues an operation instruction signal S1 to the transmitter 1 and another operation instruction signal S2 to the receiver 2.

In this particular embodiment shown in FIG. 2, the above stated operation instruction signals S1 and S2 are alternately issued in a continuously repeating manner. In this case, the system is arranged to constantly monitor the internal pressure of the tire even while the vehicle is running. In cases where the internal pressure of the tire is to be checked only at the time of starting the vehicle, for example, it suffices to have these operation instruction signals S1 and S2 issued only once respectively.

Further, if each wheel of a vehicle is provided with a first device EQ1 having a loop-shaped antenna 6, a single second device EQ2 may be used with an antenna 4 associated with the first devices EQ1.

When the operation instruction signal S1 is issued to the transmitter 1, the transmitter 1 keeps on sending out a signal (or an exciting energy) of a frequency equal to the natural frequency (let us assume it to be $fo$) of the crystal resonator of the first device EQ1 through the antenna 4 while the above stated operation instruction signal S1 is issued.

When the internal pressure of the tire 9 is normal, the pressure responsive element 7 is closed to electrically connect the antenna 6 to the crystal resonator 8 and thus the first device EQ1 is forming a closed circuit. Therefore, when the signal of the above stated frequency $fo$ is sent out from the second device EQ2, the first device EQ1 has an induced electromotive force produced at its antenna 6 by electromagnetic induction. This induced electromotive force then causes an exciting current flow to the crystal resonator 8. The crystal resonator 8 then begins to oscillate at its natural frequency $fo$ and has its oscillatory energy accumulated there. Following this, when the operation instruction signal S1 ceases to be issued, the operation instruction signal S2 is issued immediately. Then the operation of the transmitter 1 comes to a stop and the receiver 2 starts to operate. With the operation of the transmitter 1 coming to a stop, i.e. when the exciting energy from the transmitter 1 is cut off, the oscillatory energy accumulated at the crystal resonator 8 causes the crystal resonator 8 to go on oscillating for a while in an attenuating or damping manner as shown in FIG. 2. This damping oscillation of the crystal resonator 8 causes the first device EQ1 to send out a signal having the natural frequency $fo$ of the crystal resonator 8 to the antenna 6. Then, the same signal is electromagnetically induced at the antenna 4 of the second device EQ2. The above sending and receiving of the signals is hereinafter called as "energy change". In other words, the oscillatory energy accumulated at the crystal resonator 8 is transmitted to the receiver 2 of the second device EQ2 when the supply of the exciting energy is cut off. Since the receiver 2 is in operation in response to the operation instruction signal S2 at this point of time, the receiver 2 detects the oscillating energy which is being discharged from the crystal resonator 8 for a while in the damping manner shown in FIG. 2. The detection of this oscillating energy by the receiver 2 then does not cause the speaker 3 to produce any alarm sound.

When the pressure in the inside of the tire 9 abnormally decreases, the pressure responsive element 7 of the first device EQ1 comes to operate and opens its circuit to bring the antenna 6 and the crystal resonator 8 into their open states. Then, unlike the above stated condition of having normal pressure within the tire, no exciting current flows to the crystal resonator 8 as shown in FIG. 2 and no oscillatory energy is accumulated at the crystal resonator 8.

Accordingly, when the transmission of the exciting energy from the transmitter 1 is cut off at the second device EQ2, the antenna 6 of the first device EQ1 does not send out the signal of the damping oscillation waveform having the natural frequency of the crystal resonator 8. Then, even when the receiver 2 has been rendered operative by the operation instruction signal S2, the receiver 2 does not receive or detect any oscillatory energy from the crystal resonator 8.

With no oscillatory energy from the crystal resonator 8 of the first device EQ1 detected by the receiver 2 which has been rendered operative at the second device EQ2, the speaker 3 sounds an alarm to inform, for example, a driver of the motor vehicle of the abnormal drop of the pressure within the tire 9.

Referring to FIG. 2, the period of time T1 for which the operation instruction signal S1 is issued from the transmitting/receiving switch-over circuit 5 for the operation of the transmitter 1 and the period of time T2 for which the operation instruction signal S2 is issued from the circuit 5 for the operation of the receiver 2 are set, for example, at 100 m sec. With this setting, the crystal resonator 8 is driven or excited for a period of 100 m sec. After the excitation is stopped, the crystal resonator 8 keeps on oscillating for about 10 m sec. That is, the duration time t of the damping oscillation wave (wave received at the receiver 2) is about 10 m sec. After the operation of the transmitter 1 is stopped by ceasing of the operation instruction signal S1 to be issued, a period of about 2 m sec is required before having the receiver 2 completely operative. Accordingly, the period of time for which the receiver 2 receives the damping oscillation from the crystal resonator 8 is about 8 m sec. It has been ascertained through experiments that this receiving period of time of about 8 m sec is sufficient for detecting an abnormality in the internal pressure of the tire.

Further, in the second device EQ2, the antenna 4 has the output terminal of the transmitter 1 and the input terminal of the receiver 2 both connected thereto. This simple double connection arrangement is feasible by taking into consideration the output impedance of the transmitter 1 and the input impedance of the receiver 2. It is also possible to have the antenna 4 alternately connected in a switching-over manner to the transmitter 1 and to the receiver 2 with signals from the transmitting-/receiving switch-over circuit 5.

Figure 3:
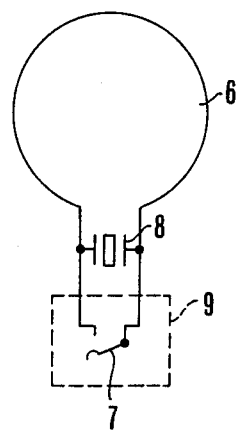
FIGS. 3 and 5 are circuit diagrams showing other embodiments relative to a first device included in the invented system.

In another embodiment, the first device using a crystal resonator and a pressure responsive element in combination is arranged as shown in FIG. 3 as second embodiment with regard to the first device EQ1. In FIG. 3, the same reference numerals are used as in the first embodiment described in the foregoing.

While the crystal resonator 8 and the pressure responsive element 7 are connected in series relative to the antenna 6 in the case of the first embodiment, the crystal resonator 8 and the pressure responsive element 7 in the second embodiment are connected in parallel. In this case, the pressure responsive element 7 is in an open state when the pressure within the tire 9 is normal and a closed circuit is formed between the crystal resonator 8 and the antenna 6. When the pressure within the tire 9 is abnormal, the pressure responsive element 7 is brought into a closed state to short-circuit the two ends of the crystal resonator 8 and there is formed no closed circuit between the crystal resonator 8 and the antenna 6.

With the first device EQ1 arranged in this manner, an energy change is carried out between the first device EQ1 and the second device EQ2, which is arranged as shown in FIG. 1, to perceive that the pressure within the tire 9 is normal when the pressure responsive element 7 is in the open state. This change of energy does not take place when the pressure responsive element 7 is in the closed state and thereby an abnormality in the pressure within the tire 9 is detected.

The energy change between the second device EQ2 and the first device EQ1 which is arranged in accordance with the second embodiment is carried out in the same manner as in the first embodiment and can be readily understood.

In this particular embodiment, the oscillatory energy having the natural frequency of the crystal resonator 8 of the first device EQ1 is arranged to be sent out when the pressure within the tire 9 is normal. However, instead of this arrangement, the oscillatory energy may be arranged to be sent out when the pressure within the tire 9 is abnormal. For such arrangement, in the case of the first device EQ1 shown in FIG. 1, the pressure responsive element 7 may be replaced with a pressure sensitive switch that is normally open (when the pressure is normal) and is closed when the pressure is abnormal. For the first device EQ1 shown in FIG. 3, the pressure responsive element 7 may be replaced with a pressure sensitive switch that is normally closed and is arranged to open when the pressure is abnormal.

However, taking into account the possibility of having the abnormal pressure detecting system out of order, the arrangements shown in FIGS. 1 and 3 are preferable in respect of the technological ideology of "fail-safe" and particularly in a case where it is desired to constantly monitor the internal pressure of the tire by repeating the switching-over action of the transmitting-/receiving switch-over circuit 5 even while the motor vehicle is running.

Generally, the natural frequency $f_o$ of a crystal resonator varies with ambient temperature. Besides, unevenness among products also causes fluctuation of the natural frequency $f_o$. The tolerance for frequency deviation $\Delta f$ of the natural frequency of the crystal resonator due to changes in ambient temperature and/or unevenness of products is, for example, about ±80 Hz for 4 MHz.

Therefore, when the transmission frequency of the exciting energy to be sent out from the second device EQ2 is fixed at $f_o$, if a deviation takes place within the range of $\pm \Delta f$ in the natural frequency of the crystal resonator 8, the amount of the oscillatory energy to be accumulated at the crystal resonator 8 by the exciting energy of the above stated frequency $f_o$ decreases. Then, this would lower the detection level of the oscillatory energy coming from the crystal resonator 8 to be received at the receiver 2 and this might result in an erroneous action.

Figure 4:
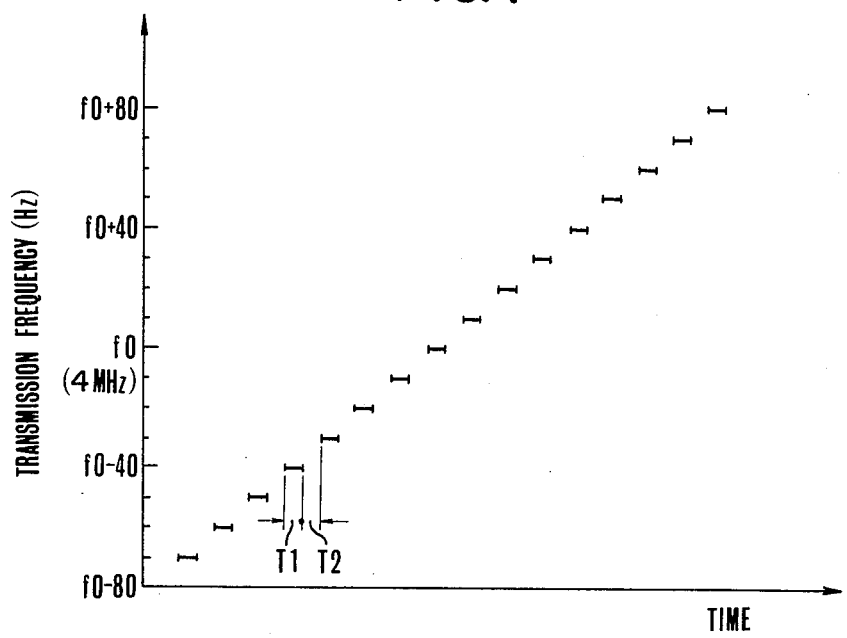
FIG. 4 is an illustration of another embodiment relative to a second device included in the invented system.

The above stated variation in the natural frequency of the crystal resonator 8 is therefore taken into consideration in another embodiment which is as shown in FIG. 4 and in which the second device EQ2 is arranged as a second embodiment relative thereto. FIG. 4 shows the form and the frequency of the signal (or the exciting energy) to be sent out from the transmitter 1 of the second device EQ2.

In the case of the second embodiment relative to the second device EQ2, the frequency of the signal sent out from the transmitter 1 is arranged to be swept within the range of deviation of the natural frequency of the crystal resonator 8 of the first device EQ1 before it is gradually sent out.

For example, where the natural frequency of the crystal resonator 8 is 4 MHz and its deviation is ±80 Hz as mentioned in the foregoing, the frequency of the transmission signal from the transmitter 1 is set in 17 steps from $fo-80\times10^{-6}$ MHz through $fo+80\times10^{-6}$ MHz with each step set at every 10 Hz. The signals thus set are sent out one after another. Meanwhile, the receiver 2 is arranged to detect discharge or no discharge of the accumulated oscillatory energy from the first device EQ1 every time one signal is sent out. The pressure within the tire 9 is judged to be normal if the oscillatory energy is detected at least once in case where the crystal resonator 8 of the first device EQ1 is arranged to be excited when the pressure is normal.

In practising the second embodiment relative to the second device EQ2, the transmitter 2 is arranged, for example, by modifying the transmitter 2 shown in FIG. 1 in the following manner:

The frequency determining factors for the transmission signals of the transmitter 1 are arranged to correspond to 17 different frequency values with 8 values set before $fo$ and other 8 values set after $fo$ with $fo$ set in the middle. Meanwhile, within the transmitter 1, there is provided, for example, a counter which is arranged to be advanced by one step to effect change-over from one of the above stated frequency determining factors to another every time the operation instruction signal S1 is received from the transmitting/receiving switch-over circuit 5.

In this case, it might appear necessary to have the receiving frequency of the receiver 2 switched over in synchronism with the frequency change of the transmission signal effected at the transmitter 1. However, in this embodiment, the frequency of the transmission signal from the transmitter 1 varies only within a small range and can be sufficiently included within the range of frequency receivable at the receiver 2. Therefore, it suffices to set the receiving frequency of receiver 2 at $fo$ which is in the middle of the frequency range of the transmission signal of the transmitter 1 and there is no particular need for switch-over control over the receiving frequency.

The transmission time T1 of the transmission signal from the transmitter 1 and the receiving time T2 for signal receiving at the receiver 2 in this embodiment are respectively set, for example, at 125 m sec. for each step. Since there are 17 steps in this embodiment, the length of time required for one cycle of pressure monitoring is 4.25 sec.

In each of the embodiments described in the foregoing, a switch which operates when there is an abnormal drop in pressure is employed as the pressure responsive element 7 of the first device EQ1. However, it is possible to detect also an abnormal rise of pressure within the tire 9 by using a switch which operates when the pressure abnormally rises as the pressure responsive element 7. It often actually happens that an abnormal rise of the internal pressure of a tire results from an increase in the temperature of tire while a motor vehicle is running at a high speed to bring forth a dangerous condition. The use of the pressure responsive element 7 in the above stated manner is advantageous in such a case.

While, in the preceding embodiments, the pressure responsive element has been described to be used independently of the crystal resonator, a pressure responsive device (hereinafter will be called crystal type pressure responsive element) in which a crystal resonator is used as a pressure sensitive element utilizing the property thereof mentioned in the foregoing that its natural frequency saliently varies with the change of pressure has been known. This crystal type pressure responsive element is also usable for the invented abnormality detecting system for detection of abnormal internal pressure of a tire.

Figure 5:
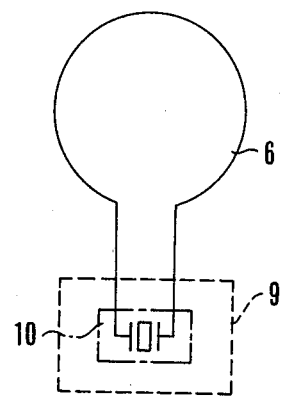

FIG. 5 shows a circuit arrangement of an embodiment in which the crystal type pressure responsive element is employed for the first device EQ1. A reference numeral 10 indicates this crystal type pressure responsive element. With the exception of this, other parts are identical with FIG. 1. In this embodiment, the second device EQ2 may be arranged basically in the same manner as the second device EQ2 shown in FIG. 1.

In the case of the embodiment shown in FIG. 5, the crystal type pressure responsive element 10 to be used has the following property: Assuming that the deviation from the natural frequency of the crystal resonator under the normal range of the internal pressure of the tire is, for example, $\pm 2$ KHz, the crystal type pressure responsive element 10 is capable of bringing about more than $\pm 2$ KHz of deviation from the natural frequency.

The frequency of the signal (or the exciting energy) transmitted from the transmitter 1 of the second device EQ2 is subjected to sweeping over $fo \pm 2$ KHz. Then, under the normal pressure condition, the swept transmission signal has a frequency close to the natural frequency of that moment of the crystal type pressure responsive element 10 and an oscillatory energy is accumulated at the crystal resonator of the crystal type pressure responsive element 10. Under an abnormal pressure condition, however, the natural frequency of the crystal resonator of the crystal type pressure responsive element 10 deviates in excess of the range of frequency $fo \pm 2$ KHz and, therefore, no oscillatory energy is accumulated.

In view of the above, the receiver 2 is arranged to be operated by the operation instruction signal S2 at every step during the above stated sweepage on the transmission signal of the transmitter 1. Then, when the internal pressure of the tire is normal, discharge of the oscillatory energy from the crystal type pressure responsive element 10 of the first device EQ1 can be received by the receiver 2 at least at one of the steps of the sweepage in the same manner as in the preceding embodiment example. When the internal pressure of the tire is abnormal, the discharge of the oscillatory energy cannot be received by the receiver 2 at any of the sweeping steps. Therefore, after the process of sweepage is performed on all steps of the frequency of the transmission signal from the transmitter 1, the internal pressure of the tire can be judged to be normal or abnormal by detecting whether the signal (or the oscillatory energy) is received at the receiver 2 from the crystal type pressure responsive element 10 during one cycle of the above stated sweepage.

In this embodiment, the transmitter 1 of the second device EQ2 may be arranged in the same manner as the second embodiment relative to the second device EQ2 shown in FIG. 4. However, since the width of the frequency deviation of the transmission signal to be swept is wider in this case than in the case of FIG. 4, each step of sweepage is set to be larger and is set, for example, at 200 Hz and the number of steps is also set at 11.

As for the arrangement of the receiver 2, the width of deviation of frequency relative to the receiving frequency which is in the middle does not exceed $10^{-3}$ also in this embodiment. Therefore, there is also no particular need for having switch-over control of the receiving frequency.

Further, in this embodiment, the natural frequency of the crystal type pressure responsive element 10 is proportional to the pressure within the tire 9. Therefore, the pressure within the tire 9 can be found by arranging the frequency of the above stated transmission signal at each sweeping step to be compared with the pressure existent at that time and by reading the above stated sweeping step when the oscillatory energy discharged from the first device EQ1 is received by the receiver of the second device EQ2.

With the sweeping steps of the transmission signal from the transmitter 2 set in an appropriate manner, this embodiment obviates, unlike the preceding embodiment, the necessity of sweeping the transmission signal to compensate for the property variation of the crystal resonator of the crystal type pressure responsive element 10 caused by variation in temperature, etc.

Since the pressure is monitored by taking firm hold of the natural frequency of the crystal resonator, this embodiment is capable of providing alarms for both an abnormal drop and an abnormal rise of the internal pressure of the tire.

Each of the embodiments described in the foregoing is arranged to receive the signal coming from the first device EQ1 disposed at each of wheels through a single piece of antenna 4 of the second device EQ2 and, therefore, is incapable of discriminating as to which of the tires has come to have abnormal internal pressure.

To overcome this shortcoming, a further embodiment is arranged to be capable of identifying a wheel which has come to have abnormal internal pressure of the tire 9. FIG. 6 shows this embodiment.

In FIG. 6, there are provided antennas 41-45 which correspond to the antenna 4 employed in the embodiment shown in FIG. 1; an antenna switch-over circuit 11 which is arranged to perform a connection action on the antennas 41-45 from one antenna to another; another group of antennas 61-65; pressure responsive elements 71-75; crystal resonators 81-85; and the interiors of tires 91-95. These parts correspond respectively to the antenna 6, the pressure responsive element 7, the crystal resonator 8 and the interior 9 of the tire used in the embodiment shown in FIG. 1. Other parts of the embodiment are indicated by the same reference numerals as in FIG. 1.

In this embodiment, the transmitting/receiving switch-over circuit 5 is arranged to issue an antenna switch-over instruction signal S3 to the antenna switch-over circuit 11 in addition to the operation instruction signals S1 and S2.

Assuming that the invention is applied to a four-wheel automobile, which has five wheels including a spare wheel, the number of tires to be monitored for internal pressure of them is 5. In this case, therefore, there are provided five first devices EQ1 for these tires as shown in FIG. 6. The second device EQ2 is provided with five antennas 41-45 which are arranged to correspond to these first devices EQ1. In the second device EQ2, the transmitter 1 and the receiver 2 are respectively combined in common with these antennas 41-45.

The antenna 41 is disposed adjacently to the antenna 61, the antenna 42 adjacently to the antenna 62, the antenna 43 adjacently to the antenna 63, the antenna 44 adjacently to the antenna 64 and the antenna 45 adjacently to the antenna 65 respectively in such a way as to permit energy change between each pair of them by electromagnetic induction.

Meanwhile, as shown in FIG. 7(A), the antenna switch-over circuit 11 is operated by the antenna switch-over instruction signal S3 issued at time intervals TA from the transmitting/receiving switch-over circuit 5 to connect the antennas 41-45 to the transmitter 1 one after another in a switching-over manner. Then, between each of the antennas 41-45 connected to the receiver 1 and each of the antennas 61-65 of the first device EQ1 corresponding thereto, there takes place signal (or energy) change in the same manner as in the case of the embodiment shown in FIG. 1 to find whether the internal pressure of each tire is normal thus individually covering all tires one after another.

Between the second device EQ2 and each of the first devices EQ1, signals are arranged to be sent out from the transmitter 1 one after another in the same manner as described in the foregoing in connection with FIG. 4. More specifically stated, a range of frequency deviation $\pm \Delta f$ having the natural frequency $fo$ of the crystal resonators 81-85 of the first devices EQ1 set in the middle thereof is swept at every given frequency interval and signals of frequency thus obtained are sent out one after another from the transmitter 1 in response to the operation instruction signal S1 issued from the transmitting/receiving switch-over circuit 5. Then, every time the signal transmission is stopped, the receiver 2 of the second device EQ2 is operated by the operation instruction signal S2 issued from the transmitting-/receiving switch-over circuit 5 to detect the presence or absence of the oscillatory energy to be discharged from each of the crystal resonators 81-85 of the first devices EQ1.

Assuming that the natural frequency $fo$ of the crystal resonators 81-85 is 4 MHz and their frequency deviation is within the range of $\pm 80$ Hz, if the sweeping is performed at intervals of 10 Hz, the signals are sent out from the transmitter 1 one after another over 17 steps. Then, assuming the operation instruction signals S1 and S2 are issued from the transmitting/receiving switch-over circuit 5 respectively for a period of 125 m sec. the length of time required for monitoring the internal pressure of one tire is 4.25 sec. Therefore, taking the length of time required for switch-over between transmission and receiving into account, the length of time of a cycle in which the antenna switch-over instruction signals S3 is to be issued as shown in FIG. 7(A) is set at about 4.5 sec. By this setting arrangement, a total length of time required for monitoring all of the five wheels becomes 22.5 sec or thereabout.

The above stated antenna switch-over instruction signal S3 may be arranged to be issued, for example, every time the counted number of the operation instruction signal S2 issuing times reaches 17 by counting the number of issuing times of the signal S2 or may be arranged to be issued at set time intervals determined by a timer or by some other known arrangement in combination with some electrical circuit means.

Further, in cases where a plurality of tires to be monitored are disposed in the same place as in the case of the double tires of a truck, first devices EQ1 which use crystal resonators of different natural frequency values $fo1$ and $fo2$ are mounted on the plurality of tires while the transmitter 1 of the second device EQ2 is arranged to send out signals (or exciting energy) of frequency values $fo1$ and $fo2$ one after another. This arrangement permits to detect abnormalities in the internal pressure of the plurality of tires by using one antenna at the second device EQ2 for the plurality of tires disposed in the same place.

The natural frequency values $fo1$ and $fo2$ of the crystal resonators 81-85 of the first devices EQ1 to be disposed at each of the double tires are set, for example, at 4 MHz and 10 MHz respectively. The transmitter and receiver 1 and 2 of the second device EQ2 are provided with parts for transmitting and receiving signals corresponding to these frequency values and are also provided with a circuit which is arranged to perform switch-over control over these transmitting and receiving parts. When the antennas 43 and 44 of the second device EQ2 are positioned, for example, to correspond to the double-tire wheel and are connected to the transmitter 1, the above stated switch-over circuit causes the transmitter 1 to send out the signals of 4 MHz and 10 MHz one after another. Then, the receiver 2 detects whether the oscillatory energy is accumulated at each of the crystal resonators 81-85 of the first devices EQ1 in response to the signals.

In the embodiment shown in FIG. 6, each of the first devices EQ1 is of the same structural arrangement as shown in FIG. 1. It goes without saying, however, that all of the varieties described in the foregoing as to the structural arrangement of the first device are also applicable to the embodiment shown in FIG. 6.

Figure 8A:
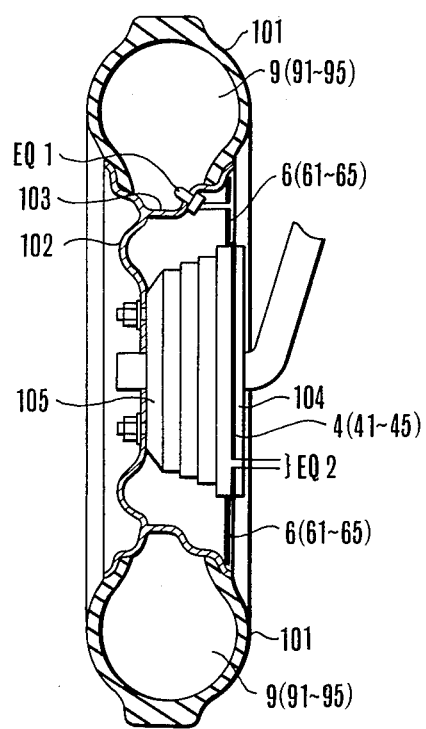
FIGS. 8(A) and 9(A) are partly sectional views showing the structural arrangement for mounting the embodiment systems of the invention on a single-tire wheel and a double-tire wheel respectively.
Figure 8B:
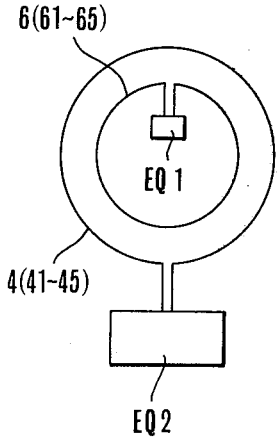
FIGS. 8(B) and 9(B) are schematic illustrations showing the arrangement of antennas of the embodiment systems as applied to single- and double-tire wheels respectively.
Figure 9A:
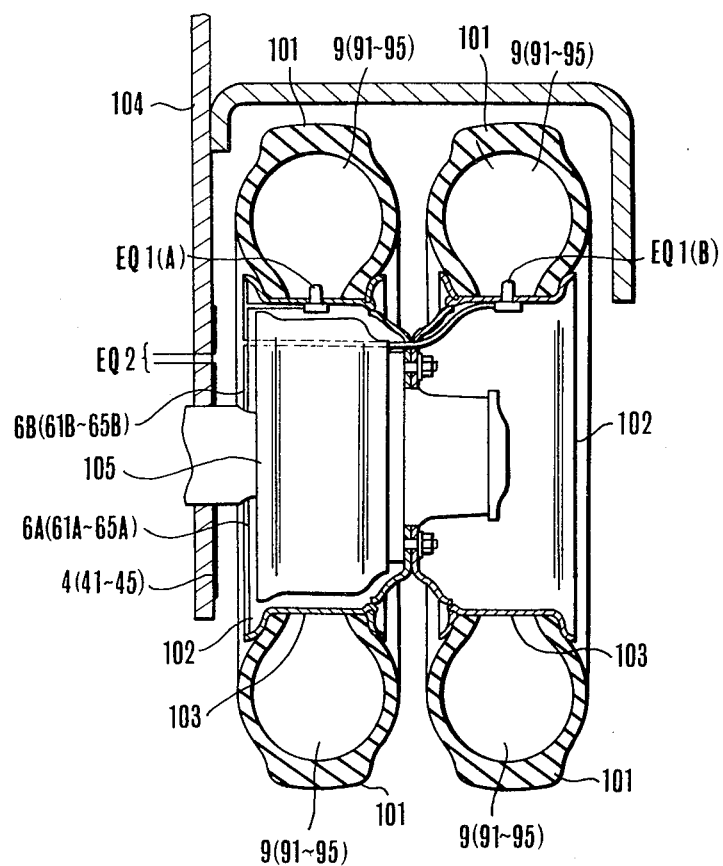
Figure 9B:
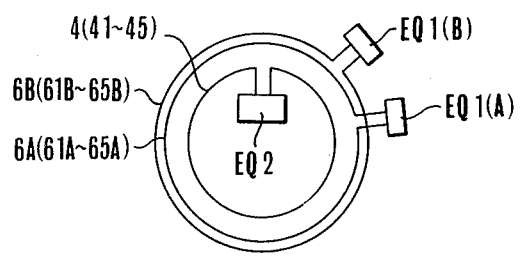

Referring now to FIGS. 8(A) and (B) and FIGS. 9(A) and (B), arrangement for mounting the invented system for detecting abnormal internal pressure of tires and particularly the mounting position of the first devices EQ1 and the mounting structural arrangement of the antennas 61-65 of the first devices EQ1 and the antennas 41-45 of the second device EQ2 are as described below:

FIG. 8(A) and FIG. 9(A) are partly sectional views respectively showing the examples of structural arrangement for mounting the above stated first device or first devices EQ1 and the antenna or antennas 6 or 61-65 and the antenna or antennas 4 or 41-45 on the single-tire and double-tire wheels. FIG. 8(B) and FIG. 9(B) are illustrations showing the relative positions of the antennas 6 or 61-65 and 4 or 41-45 for the single-tire and double-tire wheels respectively.

In these drawings FIGS. 8(A) and (B) and FIGS. 9(A) and (B), there are shown a tire 101; a rim 102; a rim base 103; a non-rotating part 104 which is a brake cover in FIG. 8(A) and a structural part of the vehicle of FIG. 9(A); and a wheel securing part 105. With the exception of these parts, other parts are indicated by the same reference numerals as those used in FIG. 1 or FIG. 6. Further, in FIG. 9, the first devices EQ1 which are provided for the double tires are distinguished from each other by adding (A) and (B) to their reference symbols.

In the case of the single-tire wheel shown in FIGS. 8(A) and (B), a hole is provided in the rim base 103 to which the tire 101 is attached and the first device EQ1 is mounted there in a position to have at least its pressure responsive element 7 (or 71-75) disposed within the interior 9 (91-95) of the tire through the hole. The antenna 6 (or 61-65) is disposd round the edge of the rim 102 and is fixed there with the antenna being electrically connected to the first device EQ1. The first device EQ1 and the antenna 6 (61-65) are thus arranged to rotate together with the wheel. Meanwhile, the antenna 4 (41-45) of the second device EQ2 is arranged not to rotate with the wheel and is secured to a non-rotating part, such as a brake cover 104, in the vicinity of the edge part to which the antenna 6 (61-65) is secured. The antenna 4 (41-45) is electrically connected to the second device EQ2 by wiring.

The antenna 6 (61-65) of the first device EQ1 and the antenna 4 (41-45) of the second device EQ2 are respectively secured to fixing parts into concentric circular shapes and is arranged as close to each other as possible to have close intercourse between them by electromagnetic induction, i.e. they are arranged to have their diameters set as close as possible to each other. For example, the distance between these antennas is set at 15 mm.

Next, in the case of the double-tire wheel shown in FIGS. 9(A) and (B), the first devices EQ1(A) and EQ1(B) in which the crystal resonators 8 (or 81-85) are arranged to have different natural frequency values are mounted respectively on the rim bases 103 of the individual tires corresponding to them in the same manner as in the case of the above stated single-tire wheel with at least their pressure responsive element 7 (71-75) disposed within the interiors 9 (91-95) of the tires. The antennas 6A (61A-65A) and 6B (61A-65B) of both the first devices EQ1(A) and EQ1(B) are disposed round the edge of one of wheel rims, of the inner rim 102 for example, and are secured thereto. These antennas 6A and 6B are then electrically connected to the first devices EQ1(A) and EQ1(B). The reason for having both antennas 6A (61A-65A) and 6B (61B-65B) secured to one of the rims 102 lies in that the presence of the rim 102 between the antenna 4 which will be described later and these antennas 6A and 6B would bring forth an electromagnetically shielded state which must be avoided for transmission of energy between them.

The antenna 4 (41-45) of the second device EQ2 is not rotating with the wheel and is arranged in a looped shape and is secured to a non-rotating part in the vicinity of the edge part of the above stated inner rim 102 to which the antennas 6A and 6B are secured, such as a structural part 104 of the vehicle close to the wheel. The antenna 4 is thus arranged to confront other antennas 6A (61A-65A) and 6B (61B-65B).

The antennas 6A (61A-65A) and 6B (61B-65B) of the first devices EQ1(A) and EQ1(B) and the antenna 4 (41-45) of the second device EQ2 are thus respectively secured to fixing parts in a concentric circular shape as shown in FIG. 9(B) in the same manner as in the above stated case of the single-tire wheel. The antenna 4 (41-45) is disposed as close as possible to the antennas 6A (61A-65A) and 6B (61B-65B) to have close intercourse between them by electromagnetic induction.

With the invented system arranged as described in the foregoing, the intrusion of external disturbing noises into the first devices EQ1 and the receiver 2 of the second device EQ2 and undesirable radiation of electromagnetic waves to the outside from the first devices EQ1 and the second device EQ2 can be effectively avoided, because:

The antenna 6 (61-65) of the first device EQ1 and the antenna 4 (41-45) of the second device EQ2 are disposed between the rim 102 and the structural part of the vehicle (104 in FIG. 9(A)) which are generally made of metals. Therefore, the rim 102 and the structural part 104 acts as electromagnetic shields to damp the above stated external disturbing noises and the radiation of unnecessary electromagnetic waves to a great extent. For change of signals between the first and second devices EQ1 and EQ2 and for discerning such signals, therefore, the above stated mounting arrangement is extremely effective.

Further, since the two antennas 4 (41-45) and 6 (61-65) can be arranged close to each other at a distance of about 15 mm, for example, they are coupled with each other very closely to minimize transmission loss and thus the signal change between the first and second devices EQ1 and EQ2 can be very satisfactorily carried out with a small transmission power.

Where this mounting arrangement is applied to a plurality of tires for monitoring them on an individual basis, a plurality of signals of the same frequency can be used because there is no fear of mutual interference between the plurality of signals.

Further, in case where it is difficult to perform necessary machining work on the rim base 103, the first device EQ1 or at least the pressure responsive element 7 (71-75) thereof is secured to the inside 9 (91-95) of the tire and the air inlet of the tire is utilized for taking a lead wire out therethrough.

As for the spare wheel, the first device EQ1 and its antenna 6 (61-65) are mounted thereon by the same mounting arrangement as the arrangement described in the foregoing. Meanwhile, the antenna 4 (41-45) of the second device EQ2 is disposed close to a spare wheel stowing place in a concentric circular shape relative to the above stated antenna 6 (61-65).

In mounting the antennas 4 (41-45) and 6 (61-65), no particular machining work on the mounting parts is necessary but they may be mounted by some adhesive tape, an adhesive agent or some other suitable means.

To prevent the electrical characteristics of these antennas 4 (41-45) and 6 (61-65) from being affected by changes in environment conditions, such as having dirt stuck thereto, and since they are generally to be mounted on metal surfaces, they are preferably covered with rubber or a synthetic resin or something like that before mounting or they are prepared from a wire material which has already been coated with such.

While the mounting arrangement of the first device EQ1 has been described in the foregoing with reference to the embodiment shown in FIG. 1 or FIG. 3, it will be clearly understood that the same mounting arrangement is also applicable to the embodiment shown in FIG. 5 in which the crystal resonator is arranged to detect the pressure by itself.

As described in detail in the foregoing, the advantages of the present invention include:

(a) The invented system utilizes the property of a crystal resonator that an oscillatory energy is accumulated at the crystal resonator when it is excited and that the oscillatory energy is discharged to the outside when it ceases to be excited. Therefore, the abnormal pressure detecting means, i.e. the first device EQ1, can be operated without any power supply thereto.

(b) The monitor device, i.e. the second device EQ2, which is arranged to monitor abnormality in the internal pressure of the tire by sending out an exciting energy for exciting the crystal resonator and then by receiving an oscillatory energy discharged from the crystal resonator is capable of performing signal change with the abnormal pressure detecting means (or the first device EQ1) by electromagnetic induction. Therefore, one of the two devices can be disposed at a rotating part (or the wheel) while the other can be disposed at a non-rotating part and the two devices can be coupled with each other in a wireless manner. It is not necessary to couple these devices by wired connection using, for example, a mechanical sliding means which has low reliability.

(c) The antenna mounting positions can be set at locations where an electromagnetic shielding effect can be obtained with the structural parts of the motor vehicle, so that signal change is possible without being disturbed by external noises and without the fear of having the signal energy discharged to the outside to become a noise.

(d) In case where signal change is to be performed individually at different wheels, the same advantage as mentioned in paragraph (c) above permits use of signals of the same frequency.

(e) Where the internal pressure of a plurality of tires disposed in the same place is to be monitored, the tires can be individually monitored by using signals of different frequency values.

(f) In mounting the abnormality detecting device on a motor vehicle, no difficult machining work on the mounting parts of the vehicle is required. The invented system, therefore, can be mounted on any kinds of motor vehicles.

Further, the present invention is not limited to abnormal pressure detection for the tires of motor vehicles but is obviously also applicable to detection of abnormal internal pressure of the tires of aircraft and the like.

What is claimed is:

1. A system for detecting abnormality in the internal pressure of a tire having a first device disposed at a wheel which includes said tire and a second device disposed at a non-rotating part, said system comprising in combination:
 a. the first device which includes:
 a-1. a pressure responsive element which is provided with a crystal resonator, said element being arranged to operate to cause a stress applied to said crystal resonator to be varied by variations of the internal pressure of said tire and thus to vary the natural frequency of the crystal resonator accordingly, and
 a-2. a first antenna connected to said pressure responsive element; and
 b. the second device which includes:
 b-1. a transmitter arranged to excite said crystal resonator by sending out one after another therefrom a plurality of different exciting energies having different frequency values within a range over which the natural frequency of said crystal resonator varies when the internal pressure of the tire is within a normal range thereof,
 b-2. a receiver arranged to receive an oscillatory energy which is discharged from the crystal resonator immediately after said excitation of the crystal resonator by the exciting energy from said transmitter comes to a stop with the oscillatory energy accumulated by the exciting energy at the crystal resonator and discharged therefrom immediately after the ceasing of said exciting action on the crystal resonator,
 b-3. a second antenna connected to said transmitter and receiver, the second antenna being arranged to send said exciting energy to said first antenna and to receive said discharged oscillatory energy from said first antenna,
 b-4. a switch-over circuit arranged to stop the exciting energy sending out action of said transmitter after the exciting energy is sent out from the transmitter and to allow said receiver to begin the receiving action thereof, and b-5. an alarm circuit connected to said receiver, said alarm circuit being arranged to announce abnormality when the abnormality is detected by the receiver, the abnormality being determined on the basis that the oscillation frequency of the discharged oscillatory energy comes outside of a preset range of oscillation frequency.

2. A system according to claim 1, wherein the internal pressure of said tire is constantly monitored with said switch-over circuit arranged to operate in a repeating manner.

3. A system according to claim 1, wherein said first antenna is formed into a loop-like shape and is disposed round the rim base of said wheel; and said second antenna is formed also into a loop-like shape and is disposed at a non-rotating part in the vicinity of said rim base, said second antenna being arranged in a concentric circular manner with said first antenna.

4. A system for detecting abnormality in the internal pressure of tires having a first device disposed at each of a plurality of wheels including tires and a second device disposed at a non-rotating part, said system comprising:

a. each of said first devices, which includes:

a-1. a pressure responsive element which is provided with a crystal resonator, said element being arranged to operate to cause a stress applied to said crystal resonator to be varied by variations of the internal pressure of said tire and thus to vary the natural frequency of the crystal resonator accordingly, and a-2. a first antenna connected to said pressure responsive element; and b. said second device, which includes:

b-1. a transmitter arranged to excite said crystal resonator by sending out one after another therefrom a plurality of different exciting energies having different frequency values within a range over which the natural frequency of said crystal resonator varies when the internal pressure of the tire is within a normal range thereof, b-2. a receiver arranged to receive an oscillatory energy which is discharged from the crystal resonator immediately after said excitation of the crystal resonator by the exciting energy from said transmitter comes to a stop with the oscillatory energy accumulated by the exciting energy at the crystal resonator and discharged therefrom immediately after the ceasing of said exciting action on the crystal resonator, b-3. second antennas provided for said plurality of wheels, each of said second antennas being connected to said transmitter and receiver, each second antenna being arranged to send said exciting energy to said first antenna and to receive said discharged oscillatory energy from said first antenna of a corresponding first device disposed at one of said plurality of wheels, b-4. A switch-over circuit arranged to stop the exciting energy sending out action of said transmitter after the exciting energy is sent out from the transmitter and to allow said receiver to begin the receiving action thereof, b-5. an antenna switch-over circuit arranged to switch over the connection of at least the transmitter with the second antennas from one of said second antennas to another at the end of every cycle of the switching action of said switch-over circuit, and b-6. an alarm circuit connected to said receiver, said alarm circuit being arranged to announce abnormality of each individual wheel when the abnormality thereof is detected by the receiver, the abnormality being determined on the basis of that the oscillation frequency of the discharged oscillatory energy comes outside of a preset range of oscillation frequency.

5. A system according to claim 4, wherein the internal pressure of said tires is constantly monitored with said switch-over circuit and said antenna switch-over circuit arranged to operate in a repeating manner respectively.

6. A system according to claim 4, wherein the crystal resonators of said first devices disposed at a plurality of wheels located in the same place are arranged to have different mid values of natural frequency from each other; and said transmitter of said second device is arranged to send out one after another a plurality of exciting energies of different frequency values with frequency values equal to said different natural frequency values respectively set in the middle of frequency range thereof.

7. A system according to claim 4, wherein each of said first antenna is formed into a loop-like shape and is disposed round the rim base of said wheel; and each of said second antenna is formed also into a loop-like shape and is disposed at a non-rotating part in the vicinity of said rim base, said second antenna being arranged in a concentric circular manner with said first antenna.

* * * * *